(12) United States Patent
Thompson et al.

(10) Patent No.: US 6,826,564 B2
(45) Date of Patent: Nov. 30, 2004

(54) SCALABLE AND PROGRAMMABLE QUERY DISTRIBUTION AND COLLECTION IN A NETWORK OF QUERYABLE DEVICES

(75) Inventors: Nicholas Thompson, San Francisco, CA (US); William Welch, San Francisco, CA (US); Kevin J. Lang, San Francisco, CA (US); Steven McCanne, Berkeley, CA (US); Matthew G. Podolsky, Berkeley, CA (US)

(73) Assignee: FastForward Networks, San Francisco, CA (US)

( * ) Notice: Subject to any disclaimer, the term of this patent is extended or adjusted under 35 U.S.C. 154(b) by 327 days.

(21) Appl. No.: 09/900,704

(22) Filed: Jul. 6, 2001

(65) Prior Publication Data

US 2002/0073086 A1 Jun. 13, 2002

Related U.S. Application Data

(60) Provisional application No. 60/217,250, filed on Jul. 10, 2000.

(51) Int. Cl.$^7$ .............................................. G06F 17/30
(52) U.S. Cl. ............................................. 707/4; 707/5
(58) Field of Search ............................ 707/3, 4, 6, 5, 707/10, 101; 370/254, 332; 379/114.01, 221.03; 455/423; 700/3; 705/1; 709/203, 225

(56) References Cited

U.S. PATENT DOCUMENTS 6,385,604 B1 * 5/2002 Bakalash et al. ............... 707/3
6,415,323 B1 * 7/2002 McCanne et al. ........... 709/225
6,553,404 B2 * 4/2003 Stern .......................... 709/203
6,601,062 B1 * 7/2003 Deshpande et al. ............ 707/3
2002/0073086 A1 * 6/2002 Thompson et al. .......... 707/10

* cited by examiner

Primary Examiner—Diane D. Mizrahi
Assistant Examiner—Apu M Mofiz
(74) Attorney, Agent, or Firm—Philip H. Albert; Townsend and Townsend and Crew, LLP

(57) ABSTRACT

In a network, a query originator injects queries of network devices into the network at a query node using query messages. The network transports the query messages to the network devices, or to network nodes at which queries about the network devices can be answered. Query responses from the network devices or network nodes are directed through the network to a collection node or nodes. As an internal network node receives multiple query responses from network devices, the internal network node might aggregate, as needed, the multiple query responses into an aggregated query response that preferably occupies less bandwidth than the aggregated multiple query responses. Where the result desired at the collection node is a computed function of the multiple query responses, the computed function can be performed at each internal network node on the multiple query responses received at that node, thus distributing the computation needed to form a collected response to the query. Queries might request real-time or non-real-time responses and queries might request one response, periodic responses or one response for each occurrence of an event. The internal network nodes might store lookup tables, or access a centralized lookup table, that specify details of queries, thus obviating the need for each query message to carry all of the necessary details of the query.

14 Claims, 14 Drawing Sheets

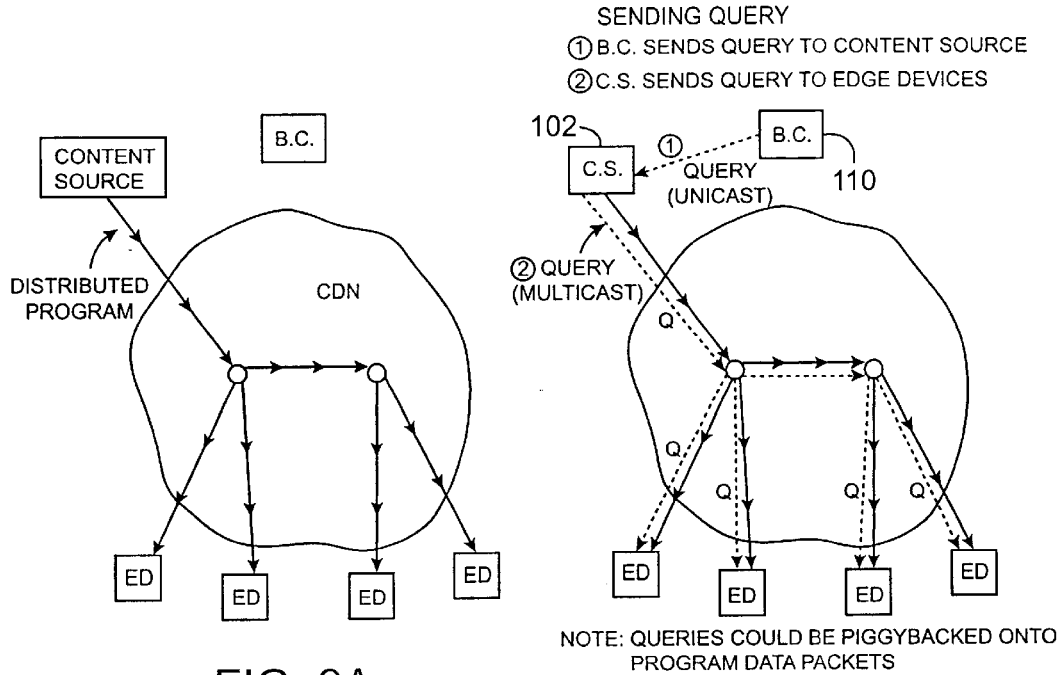
FIG. 9A
FIG. 9B
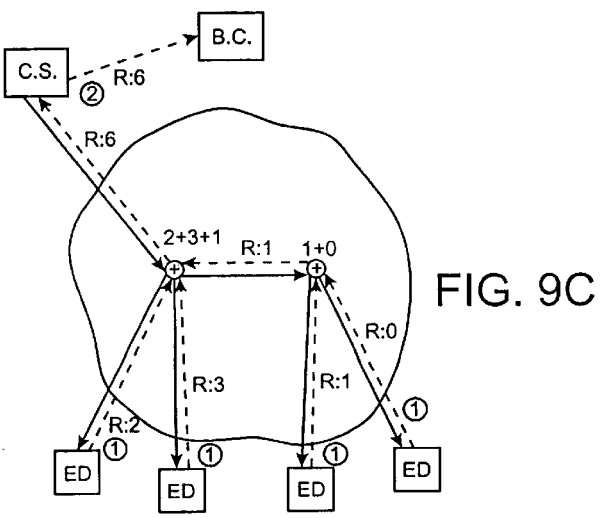
FIG. 9C

SCALABLE AND PROGRAMMABLE QUERY DISTRIBUTION AND COLLECTION IN A NETWORK OF QUERYABLE DEVICES

CROSS-REFERENCES TO RELATED APPLICATIONS

This application claims priority from Provisional Application No. 60/217,250, filed on Jul. 10, 2000 and is incorporated herein by reference for all purposes.

This application may reference:

U.S. patent application Ser. No. 09/323,869, entitled "Performing Multicast Communication In Computer Networks By Using Overlay Routing", filed Jun. 1, 1999 (hereinafter referred to as "McCanne I");

U.S. patent application Ser. No. 09/384,865, entitled "System for Bandwidth Allocation in a Computer Network", filed Aug. 27, 1999 (hereinafter "Welch");

U.S. patent application Ser. No. 09/412,815, entitled "System For Multipoint Infrastructure Transport In A Computer Network", filed Oct. 5, 1999 (hereinafter "the MINT application");

U.S. patent application Ser. No. 09/458,216, entitled "A Proximity-Based Redirection System For Robust And Scalable Service-Node Location In An Internetwork", filed Dec. 9, 1999 (hereinafter "McCanne II"); and U.S. patent application Ser. No. 09/609,442, entitled "A Content Distribution System For Operation Over An Internetwork Including Content Peering Arrangements", filed Jul. 3, 2000 (hereinafter "McCanne III").

The disclosures of the above-referenced applications are also incorporated in their entirety herein by reference for all purposes and those applications are assigned, or the inventors are under an obligation to assign, to the assignees of the present application.

FIELD OF THE INVENTION

The present invention relates to methods and apparatus for querying large numbers of devices using a network. More specifically, the present invention relates to efficiently and scaleably issuing queries to devices from a monitor and collecting results of those queries.

BACKGROUND OF THE INVENTION

Connecting large numbers of devices to a network is known. Perhaps the most referenced network, and possibly the most used, is the global internetwork of networks known as the "Internet". With the Internet and other networks, a network manager of all or part of the network often needs to query devices at many nodes of the network. In the Internet field, a protocol known as SNMP (Simple Network Management Protocol) has been in wide use for querying devices for status and collecting responses. Some details of SNMP are set forth in Request for Comments (RFC) 1156 (May 1990) and RFC 1157 (May 1990). RFC's form the basis for many standards used in connection with the Internet and are widely available.

Using SNMP, a network monitor would send queries out to devices that are responsive to SNMP and the devices would respond to the queries back to the network monitor. The network monitor is coupled to the network at a network node and the devices are coupled to the network as well. SNMP might work well with one network monitor querying dozens, hundreds or even thousands of devices, but becomes problematic with greater numbers of devices. One problem is that the network around the network node gets congested as the network monitor attempts to send SNMP query request packets to each device. Even if the query request could be broadcast to the devices, using multicasting or other techniques, the returning query responses would bog down the network near the network node. Such congestion would occur with only one response per device, so the congestion could be expected to be much worse if each device sends more than one response per query, as might be the case for a query that requests periodic updates from a device.

Often, a network comprises many networked devices. Operating such a network is typically a critical yet complex task requiring refined mechanisms for configuring, managing, debugging, monitoring, and measuring equipment and equipment performance. While protocols and tools for managing individual pieces of equipment within a network are well understood, systems for managing or monitoring an ensemble of equipment across a network are poorly understood and underdeveloped.

This problem becomes even more acute in the context of an emerging network abstraction called a Content Distribution Network (CDN). Examples of CDNs are described in McCanne III. A CDN routes "content", as opposed to a lower level router that merely routes individual packets. The content routed by a CDN might be a set of media streams and the content flows across the CDN to "edge devices", which might be clients for viewing or storing the content or servers that forward on the content to such clients. CDNs may function in such a way that the content is distributed to interested edge devices without requiring a centralized control point in the network that knows the exact details of which devices are receiving the content or how it is being distributed (for example, which network paths is the content flowing across). Unfortunately, management and monitoring tools often need access to this very information in order to perform their functions.

SUMMARY OF THE INVENTION

One embodiment of the present invention provides for an improved query handling system. The network transports query messages from query nodes to device nodes. Query responses from the device node are directed through the network to a collection node or nodes. The device nodes might be supported by servers that are located in the network near the network devices. Such servers would maintain information about their network devices, such as information about the data streams being served to the network devices. When an internal response network node receives multiple query responses from device nodes, the internal response network node might aggregate, as needed, the multiple query responses into an aggregated query response. Preferably, an aggregated query response occupies less bandwidth than the aggregated multiple query responses.

Where the result desired at the collection node is a computed function of the multiple query responses, such as a concatenation, sum, logical function, summary, etc., the computed function can be performed at each internal response network node on the multiple query responses received at that node, thus distributing the computation needed to form a collected response to the query.

In particular embodiments, queries might request real-time or non-real-time responses and queries might request one response, periodic responses or one response for each occurrence of an event. The internal response network nodes might store lookup tables, or access a centralized lookup table, that specify details of queries, thus obviating the need for each query message to carry all of the necessary details of the query. In a specific embodiment, query messages from a query originator to a network device identify the query being made by an index into a query lookup table. The lookup table might also include details or instructions usable by the internal response network nodes for performing an aggregation specific to the query.

A further understanding of the nature and advantages of the inventions herein may be realized by reference to the remaining portions of the specification and the attached drawings.

BRIEF DESCRIPTION OF THE DRAWINGS

FIG. 9 illustrates a query response network wherein queries about content originate with a content source;

FIG. 9(a) is a diagram illustrating content flow from a content source to edge devices;

FIG. 9(b) is a diagram illustrating a query flow along the same paths as content flow; and FIG. 9(c) illustrates response collection along those same paths.

DESCRIPTION OF THE SPECIFIC EMBODIMENTS

Figure 1:
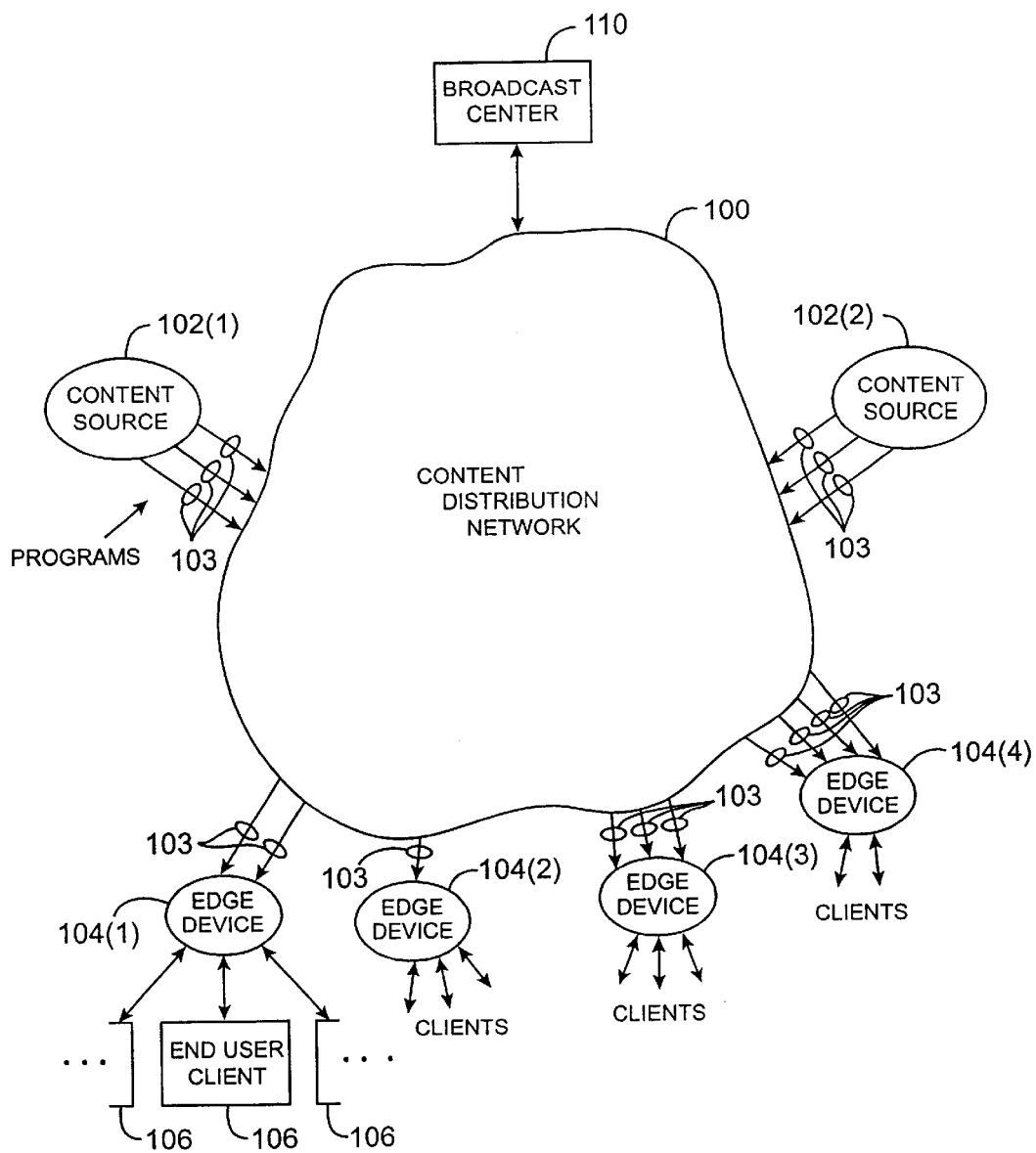
FIG. 1 is a block diagram of a generalized query handling system according to one embodiment of the present invention.

A few examples of specific embodiments of query handling systems according to the present invention are described herein. Others may become apparent after reading this description and it should be understood that the invention is not limited to these specific examples, but is limited only by the appended claims. Furthermore, while specific methods and apparatus are shown, it should be apparent upon reading this disclosure that some of the methods can be practiced using different apparatus and the apparatus shown could be used to perform different methods than shown.

This description discloses how to make and use several embodiments of a system according to the present invention, but for brevity omits descriptions of many well-known components of such systems. For example, the operation and design of a standard TCP/IP network, standard TCP/IP clients and the like are not explicitly disclosed herein, as they well described in countless readily available sources.

In the description below, like elements of the figures are referenced with like numbers. Distinct instances of like elements might be referenced with like numbers followed by distinct instance numbers in parentheses.

Query handling systems according to the present invention can operate over many different types of data networks, such as a well-known TCP/IP network. Another type of network is a content distribution network (CDN). In the figures, a query handling system using a CDN is first described, along with features specifically useful for CDNs, followed by a description of a query handling system for a generic packet-switched network. Upon review of this disclosure, it should become apparent that a query handling system could be used to query edge devices in a CDN, where the routed elements are content, such as media streams, or where the routed elements are packets, as with a packet-switched network.

As used herein, "query originator" refers to a person or machine that originates a query for information about a network. Presumably, the query is issued for the purposes of obtaining an answer to the question inherent in the query. However, other uses of issuing queries might become apparent upon review of this disclosure. For example, a query might be issued for testing purposes or to trigger an event elsewhere in the network. Such uses can be the entire reason for making the query or might be ancillary to getting an answer to the question posed.

A "query message" is data that, alone or in combination with other data (such as lookup tables), indicates what question is being asked of the network.

A "network device" is a device that is coupled to the network. A network device might be an entirely self-contained object or might be an object that interfaces with nonnetwork equipment or users.

A "query node" is a node of the network at which the query is said to originate or where the query is "injected" into the network. A network might include nodes and/or equipment between the query node and the query originator without departing from the general definition of query node used herein.

A "device node" is a network node at which a network device connects to the network or a node at which queries about that network device can be answered. Device nodes might be supported by servers that are located in the network near the network devices. Such servers would maintain information about their network devices, such as information about the data streams being served to the network devices. For a given network device, the device node, which is used for query/response activity, can be the same node the network device uses for its main function. For example, a streaming video player client might use the same IP address for receiving and responding to queries as it uses to receive streaming video (its main function). However, for other network devices, the network device's network node for its main function might be distinct from the device's device node used only for the query process.

A "collection node" is a network node at which query responses from device nodes are received. Typically, a collection node is where a response collection system is coupled to the network, however other configurations are possible.

At a high level, queries can be thought of as originating at a query node, propagating to device nodes and query responses can be thought of as originating at device nodes and propagating to collection nodes.

An "internal network node" is a network node that is between a query node and a device node or a device node and a collection node. An "internal response network node" is an internal network node on a path between a device node and a query node. An "internal query network node" is an internal network node on a path between a query node and a device node. The internal response network nodes visited by a query response as it passes from a device node to a collection node can define the same path that a query follows but in reverse, but that need not be the case. Thus, a query might follow one path from a query node to a device node and another path from the device node to a collection node, even where the query node and the collection node are the same node. In a specific embodiment, each network monitoring node is a query node and a collection node and a query follows a path through the network to a device node, encountering internal query network nodes and the response to the query follows the same path in a reverse order (albeit with some aggregation possibly occurring at various internal response network nodes), where the nodes that act as internal query network nodes act as internal response network nodes for the returning responses.

FIG. 1 is an illustration of a Content Distribution Network ("CDN") 100 with which a query handling system might be used. The details of CDN 100 are not shown, but typically might include routers, switches, caches, servers, databases, etc., as part of the network fabric. With CDN 100, content sources 102 provide content (such as programs 103) to the network and that content is provided by CDN 100 to edge devices 104 that provide the content to end-users. Of particular interest to broadcasters is the number of end-users receiving particular content and other data about the end-user clients, edge devices 104, etc. Typically, but not always, an edge device 104 will have individual connections to end-user computing devices 106, such as a point-to-point packet channel, so that an edge device is fully aware of the content received by the end-user computing devices through the CDN. In such cases, edge devices 104 would be able to answer queries about the content received by the end-user computing devices. Regardless of whether the query about an end-user device is answered by an edge device coupling the end-user device to the network, an end-user device itself or a server monitoring the end-user device apart from its coupling to the network, it should be understood that a query directed at the end-user device's device node would evoke a response (if the query calls for a response) from the device, program or logic assigned to be the respondent at that device node.

In some cases, as is shown in FIG. 1, a broadcast center ("BC") 110 monitors content broadcasting from nodes distinct from the content sources, by sending out queries to edge devices 104 and receiving subsequent query responses. In other embodiments, the content sources and broadcast center might be integrated at one network location.

Figure 2:
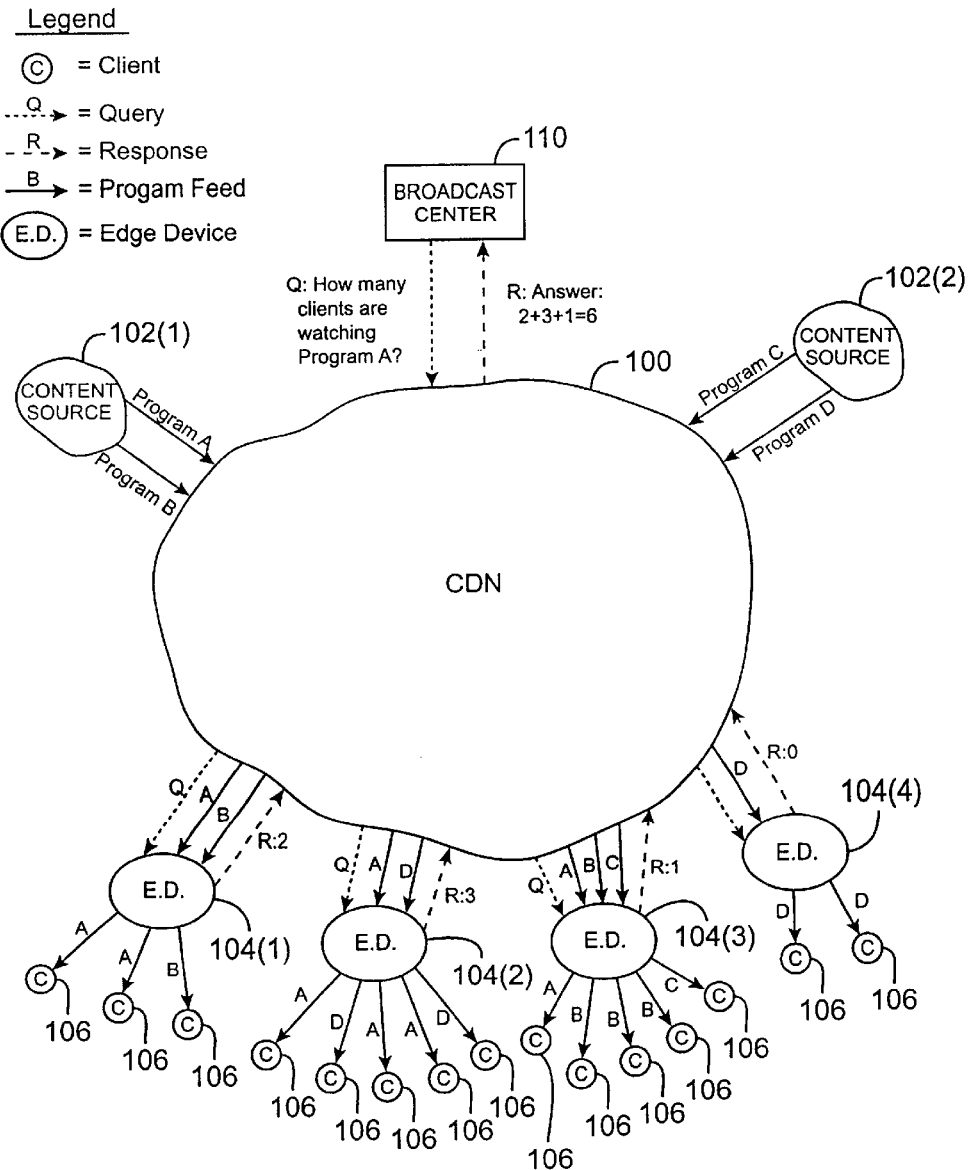
FIG. 2 is a schematic diagram similar to FIG. 1, but showing more details of traffic flow.

FIG. 2 shows the system of FIG. 1 with more details on specific data flows, such as program feeds, pathways for query messages and pathways for query responses. In FIG. 2, the transport of query messages and query responses is not illustrated; such details are shown in subsequent figures. In FIG. 2, BC 110 is a query originator, a node at which BC 110 is coupled to the network is a query node and nodes at which edge devices 104 are coupled to the network are device nodes.

A query originator can be implemented as a computing device coupled to CDN 100 (or a packet-switched network underlying CDN 100), as program code executing on a general purpose computer, as program code executing on a routing device, or the like. In one specific embodiment, software agents run within a virtual machine (VM), such as a Java™ VM executing on a computer coupled to CDN 100, act as query originators.

An example of a query respondent (i.e., a device, software or agent at which query collection starts; typically coupled to the network at a device node) is a program inside a VM that runs an SNMP agent. The SNMP agent can access Management Information Base (MIB) objects in nearby equipment and can respond to queries about the information stored in those MIB objects. MIB's are described in greater detail in RFC 1156, which is hereby incorporated by reference for all purposes.

Once the query responses are collected at a collector coupled at a collection node, the data can be provided to various processes, devices or users that need the data. For example, the data might be written to text files that may be viewed or processed later or inserted into a database. Access to the data might then be dependent on the query and who generated it. Thus, one query handling system might be used by multiple content providers, but each content provider would have to be authenticated to the collector collecting the responses, so that each content provider can only access data relating to their own content, even if the data was collected for multiple content providers. This approach is useful where the data network is run by a service provider that delivers data for more than one customer. An authentication system, such as a Web-based SSL login/authorization transaction, can ensure that only its legitimate customers can view data stored at the collector. Each customer can also be limited such that the customer cannot view all of the data collected by the service provider for that customer, if the service provider does not wish to pass on all of the collected data. If the customer is allowed to initiate queries, an authentication system can also control or limit the types of queries that the customer can perform.

If one query originator originates a query to many, many query respondents, receiving individual responses from each respondent may congest the network around the collection node. Congestion might also occur around a query node as the originator sends individual queries to each respondent. Where the query node and the collection node are the same node, this congestion could be expected for both outgoing traffic and incoming traffic, but the problems are the same whether the query node and the collection node are the same or separated. There are several methods and/or apparatus, described below, that can be used to avoid or reduce congestion at a collection node and at a query node. As explained below, congestion around a query node is often easier to resolve, and some prior art methods, such as the use of multicasting, can partially (or in some cases, entirely) solve the congestion problem at the query node.

Figure 3:
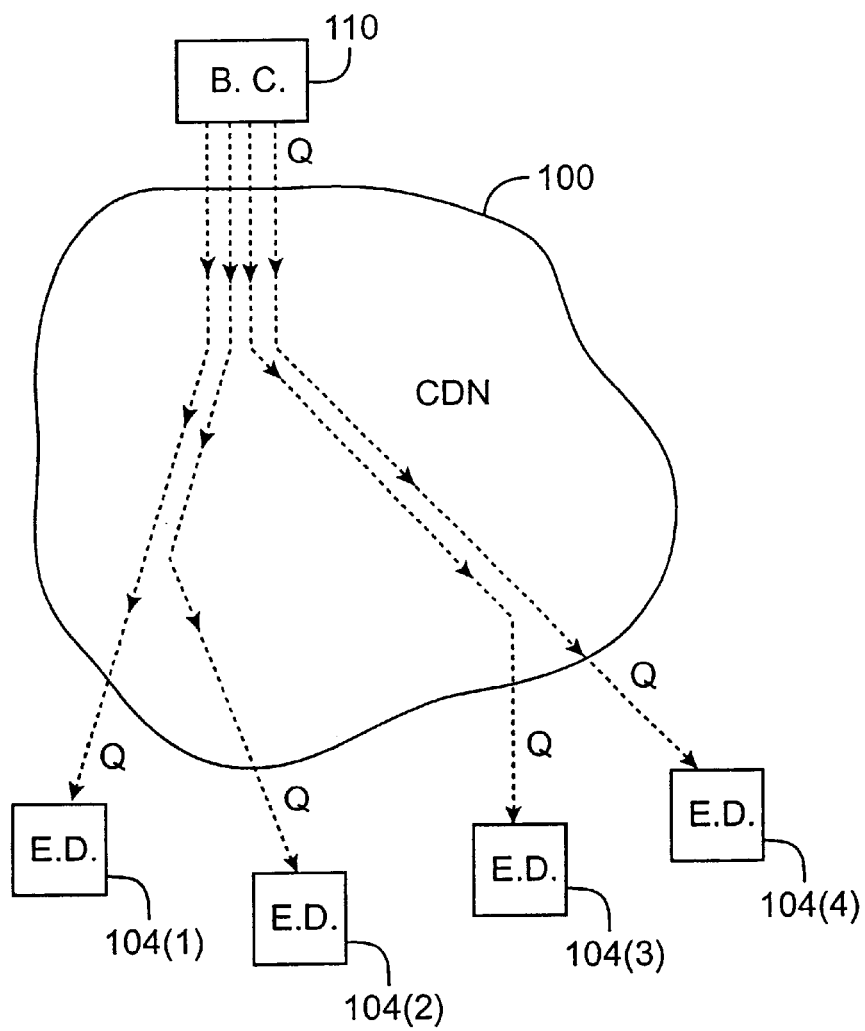
FIG. 3 is a diagram illustrating the flow of a query to device nodes.
Figure 4:
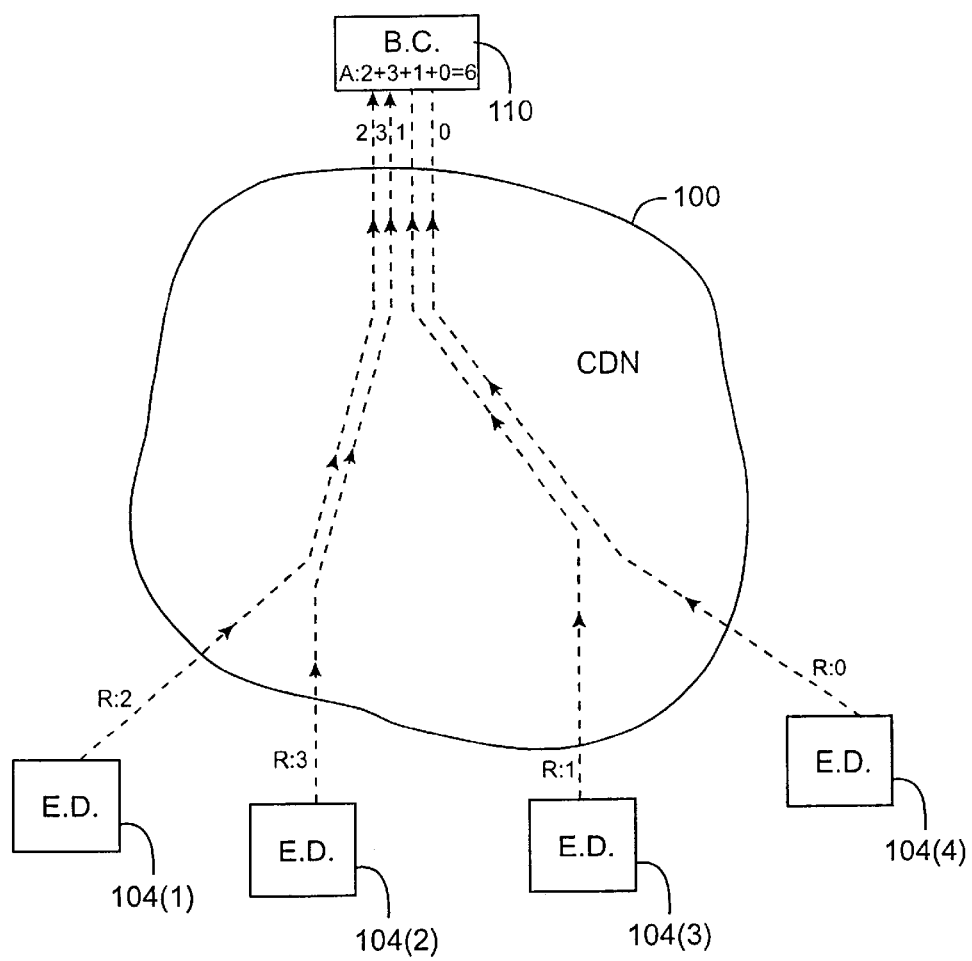
FIG. 4 is a diagram illustrating the flow of query responses from device nodes to a collection node via aggregation nodes.
Figure 5:
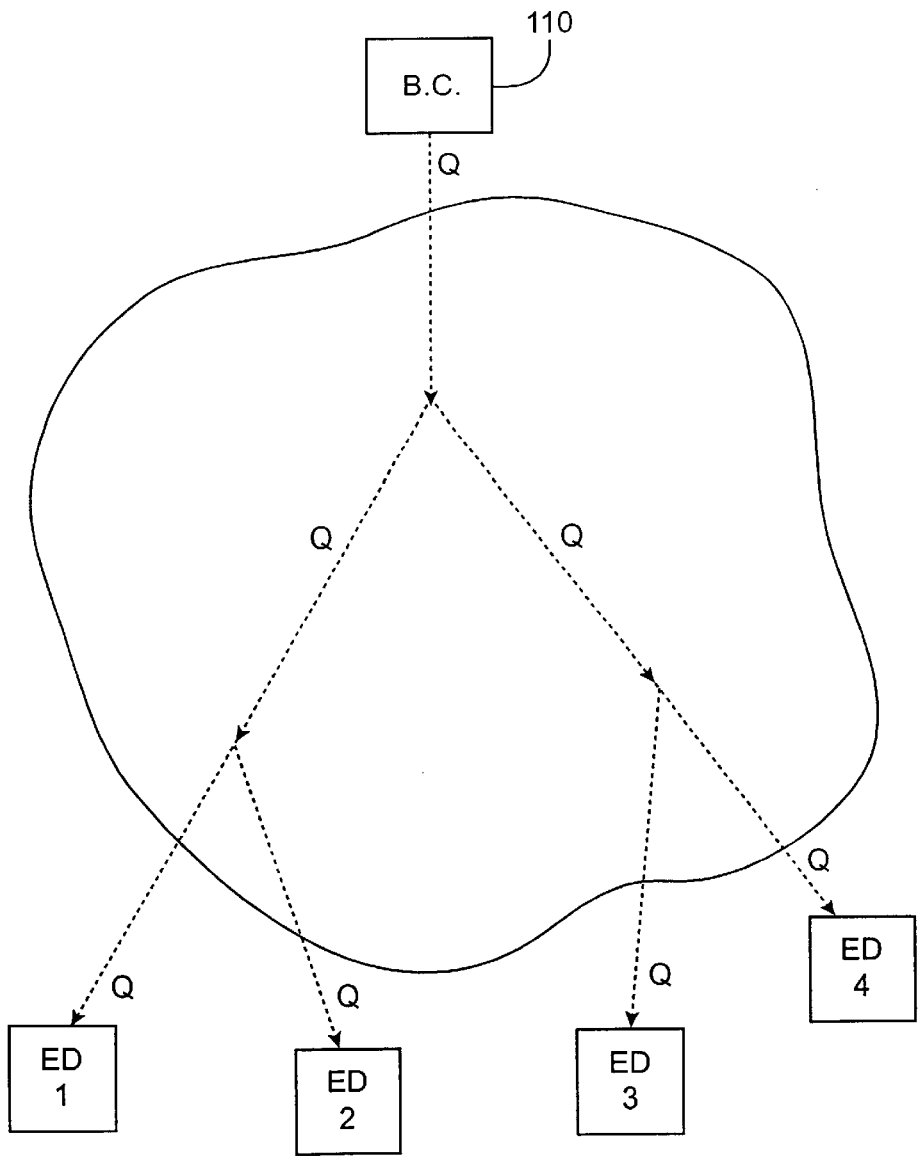
FIG. 5 is a diagram illustrating the flow of a query to device nodes using multicasting.

As the number of respondents grows, without more, there would be a proportional growth in the network bandwidth needed to deliver the query responses to their destination and the computational processing power and time needed to process the responses at the destination. To relieve bandwidth and computing bottlenecks, the data network, such as CDN 100 (shown in FIGS. 1–2, et seq.), is populated with aggregation nodes, as illustrated by FIGS. 3–5 and described in more detail below. As query responses travel between the device nodes and one or more collection nodes, the responses flow through aggregation nodes. Agents, or other computing objects, at an aggregation node perform programmable aggregation operations on received query responses that flow to the aggregation node from device nodes and forward the aggregated result on towards the collection node or nodes.

With aggregation, the maximum load on the network for query response data can be reduced from a load proportional to the number of device nodes, and instead be proportional to the maximum "fanout", where fanout refers to the number of device nodes or aggregation nodes that "report" to a given aggregation node or collection node. With aggregation, the amount of processing needed at a collection node might also be reduced. For example, with an addition aggregation operation, the maximum number of additions performed at any aggregation node or collection node is not proportional to the number of respondents but instead is proportional to the maximum fanout of that aggregation node or collection node.

Distribution Methods for Queries and Query Responses

This section describes how the network may be mapped onto specific data delivery systems for distributing queries and responses. Throughout, we use one specific example of streaming multimedia programs being delivered through a CDN. Some examples also assume the use of a sender-based multicast tree for distributing program content and queries and assume that the multicast infrastructure supports reverse-path transmission of data from the edge of the tree towards the root or core.

In the example shown in FIG. 1, multiple content sources 102 inject programs from different parts of the network, multiple edge devices 104 are located on "leaf nodes" at the edges of the network, and CDN 100 delivers program content from content sources 102 to those edge devices 104 that are interested in the content (this is a feature of CDN 100). CDN 100 comprises various interconnected nodes or routers that can deliver content from content sources 102 to edge devices 104. Further details of the operation of CDN 100 can be found in McCanne III. Edge devices 104 may be the final destination for the content (for example, they could be streaming media viewing clients), or edge devices 104 could be intermediate devices, such as servers that in turn forward content on to clients. CDN 100 could comprise a network of FastForward Mediabridge™ servers running ALM (Application-Level Multicasting), but CDN 100 could also use another delivery mechanism capable of reaching multiple receivers, such as IP multicast, a RealNetworks G2™ Splitter network, or even separate unicast connections from each content source 102 to every edge device 104 pulling down content from that content source.

In the first example shown (FIGS. 1–7), broadcast center (BC) 110 monitors the current state and health of CDN 100, the content that is flowing across it, and information from any devices used to effect CDN 100, such as the current number of clients receiving a program from CDN 100. Thus, BC 110 serves as a controller of CDN 100 as well as a query originator and a response collection system. In that case, BC 110 can be said to be at the query node and the collection node for its set of queries. Although not shown, a given network might have multiple BC's operating more or less independently.

Of course, those three functions (CDN control, querying, collecting) do not necessarily have to be located at the same point in the network. FIG. 1 only represents a logical view of a CDN; it is not intended to imply that BC 110 or content sources 102 must be located on the "edge" of CDN 100. In many cases, it will be beneficial to locate these elements close to the center or "core" of CDN 100.

FIG. 2 is a schematic diagram similar to FIG. 1, but showing more details of traffic flow related to a querying process. As an example of a querying process, BC 110 might issue a query to determine how many clients are watching program A (i.e., receiving the content associated with program A). As shown, content source 102(1) is injecting two programs, A and B, into the network and content source 102(2) is injecting two other programs, C and D, into the network. Those programs are being received by edge devices 104, with each edge device typically receiving only the programs that are being fed to clients connected to that edge device, as shown. For example, clients 106 coupled to edge device 104(1) are receiving only programs A and B, so edge device 104(1) need only receive programs A and B. Edge devices 104 might be media servers that receive program streams from CDN 100 and deliver the streams to clients 106. As shown in FIG. 2, edge device 104(1) receives programs A and B; edge device 104(2) receives A and D; edge device 104(3) receives A, B, and C; and edge device 104(4) receives only stream D. If the operator of BC 110 wants to know how many people are watching program A, the operator causes BC 110 to issue a query to that effect and CDN 100 distributes the query to each edge device 104. Edge devices 104 respond with their answers (edge device 104(1): 2, edge device 104(2): 3, edge device 104(3): 1, edge device 104(4): 0) and send their responses back into CDN 100, which collects the responses, aggregates them, and preferably delivers a single total back to BC 110 (6 in this case).

In some cases, the edge devices include a naming system to map well known virtual names, which may be used in programmable queries, onto corresponding physical, equipment-specific names. This allows different, heterogeneous equipment to respond to the same query. For example, if some clients are receiving program A, but know it as program X and other clients are receiving program A, but know it as program Y, their respective edge devices could translate the query using the naming system so that queries about program A are applied to programs X and Y as well.

The following sections describe how the network maps on to various query and response distribution mechanisms. Note that not all components will be used in each instance.

Unicast Queries and Unicast Responses

FIGS. 3–4 show an example of unicast, or point-to-point, connections between BC 110 and each edge device 104. FIG. 3 is a diagram illustrating the flow of a query from BC 110 to various device nodes, where edge devices are coupled to the network. FIG. 4 is a diagram illustrating the flow of query responses from the device nodes to a collection node (which happens to be the same node as the query node, in this case) via aggregation nodes.

Not shown is program content being distributed through CDN 100 from a content source; this can be done through any arbitrary technique, including separate unicast connections to all edge devices, IP multicast, a splitter network of servers forming a distribution tree, or an application-level multicast as shown in McCanne III. The content source could be co-located at BC 110 or at any other node in the network. In addition, CDN 100 could distribute the content in one of a variety of ways. The content distribution mechanism is independent of the query/response distribution mechanism in this case.

FIG. 3 shows the first step of query handling: distributing a query message Q from BC 110 to the four edge devices 104. The dashed lines represent the separate unicast connections used to distribute the query message. The connections traverse common network links close to BC 110 and as a result, more bandwidth is used on those links because they carry multiple copies of the query message. This bandwidth usage increases as the number of edge devices increases, and hence this technique suffers from scaling problems for large networks. Additionally, the number of network connections and packets BC 110 must open and deliver also increases in proportion to the number of edge devices.

FIG. 4 shows the second step in query handling: the edge devices (the query respondents in this example) responding to the received query message. Once again, separate unicast connections are used to communicate between each edge device 104 and BC 110. The query response messages cause the same scaling problem as the unicast query messages: the bandwidth used near BC 110 and the number of network connections open at it increase linearly with the number of edge devices. Additionally, all of the replies must be processed and analyzed at BC 110. Thus, the response processing load at BC 110 scales just as poorly as the query/response network bandwidth does.

Multicast Queries and Unicast Responses

An alternative to the above is to collect the responses from the edge devices at BC 110 using separate unicast connections, but to distribute the query using multicast for the query messages. In a multicast arrangement, a distribution tree is constructed so that only a single copy of data transmitted from the source flows along any network link common between the sender and multiple receivers.

FIG. 5 shows a multicast tree distributing the query messages from BC 110 to the edge devices. Note that, unlike the arrangement shown in FIG. 3, only one connection is used, and only one copy of the query message needs to flow, across each link in the paths. This solves the network bandwidth scaling problem for the queries; however, it does nothing to solve the bandwidth and processing scaling problems for the responses. Multicast can be used to distribute the query because each edge device receives the same query. However, because each response is potentially unique, multicast cannot be used to achieve similar savings in bandwidth for response collection. As a result, if the uniqueness of the responses is dealt with again by unicasting the responses back to BC 110 (as in FIG. 4), the responses still cause bandwidth and processing scaling difficulties.

Multicast Queries and Concatenated Responses

Figure 6:
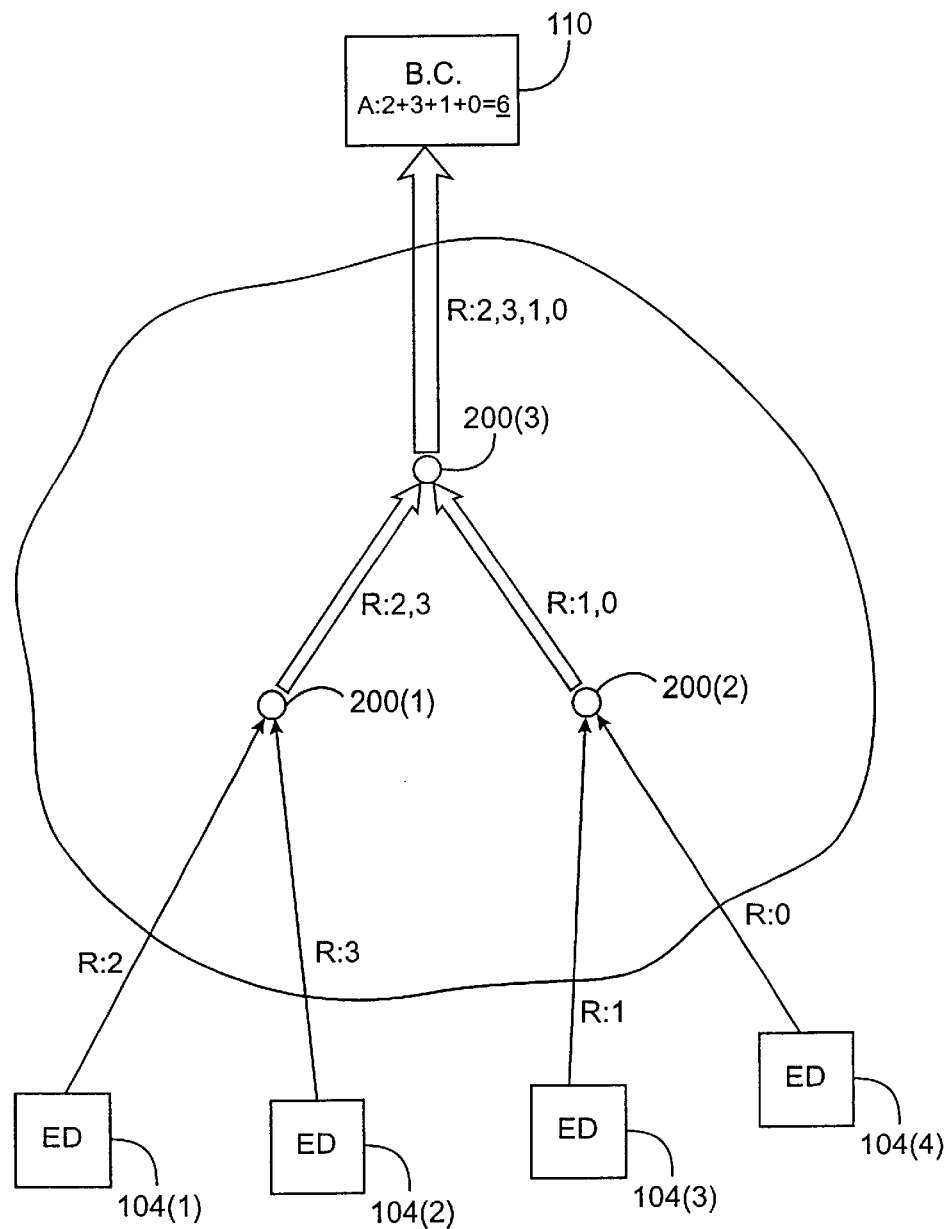
FIG. 6 is a diagram illustrating the flow of query responses to a collection node using aggregation at intermediate nodes.

FIG. 6 shows a multicast distribution tree with intermediate aggregation nodes 200 between edge devices 104 and BC 110, as might be used to collect query responses to the query sent out as illustrated in FIG. 5.

As shown, the aggregation nodes (ANs) are arranged in a hierarchical tree, with parent aggregation nodes relating to child aggregation nodes. In this case, the answers are propagated back up the multicast tree towards the root (BC 110), from child AN to parent AN, but at each aggregation node (AN) 200 along the way, the answers from the children of that AN are concatenated together and sent in a single transmission to the parent of that AN. For example, the responses from edge devices 104(1) and 104(2) are concatenated at their parent AN (AN 200(1)) and the combined response could be sent in a single packet to the parent of AN 200(1), which is AN 200(3). This can result in a reduction of some of the network processing performed by the CDN and bandwidth used in the CDN. By reducing the number of packets flowing in the network closer to BC 110, savings are achieved in network processing (fewer packets to route and process at BC 110) and bandwidth (fewer packets means fewer packet headers). However, despite these savings the amount of response data flowing towards BC 110 still grows linearly with the number of edge devices.

This bandwidth growth is illustrated by the width of the lines representing the flow of responses in FIG. 6. The widths of the lines represent the bandwidth used in transmitting a response. As the responses flow up the tree from the edge devices towards the broadcast center, the line widths increase because the size of the responses increases as more individual responses get concatenated together. As a result, the bandwidth used by this response collection scheme still grows proportionally to the number of edge devices. Furthermore, this technique does nothing to effectively scale the data processing done by BC 110; it still must combine and analyze all of the data from the senders (in this case, it must sum all of the results). Nonetheless, such a scheme is an improvement over a system of sending individual queries and receiving individual responses.

Multicast Queries and Aggregated Response

Figure 7:
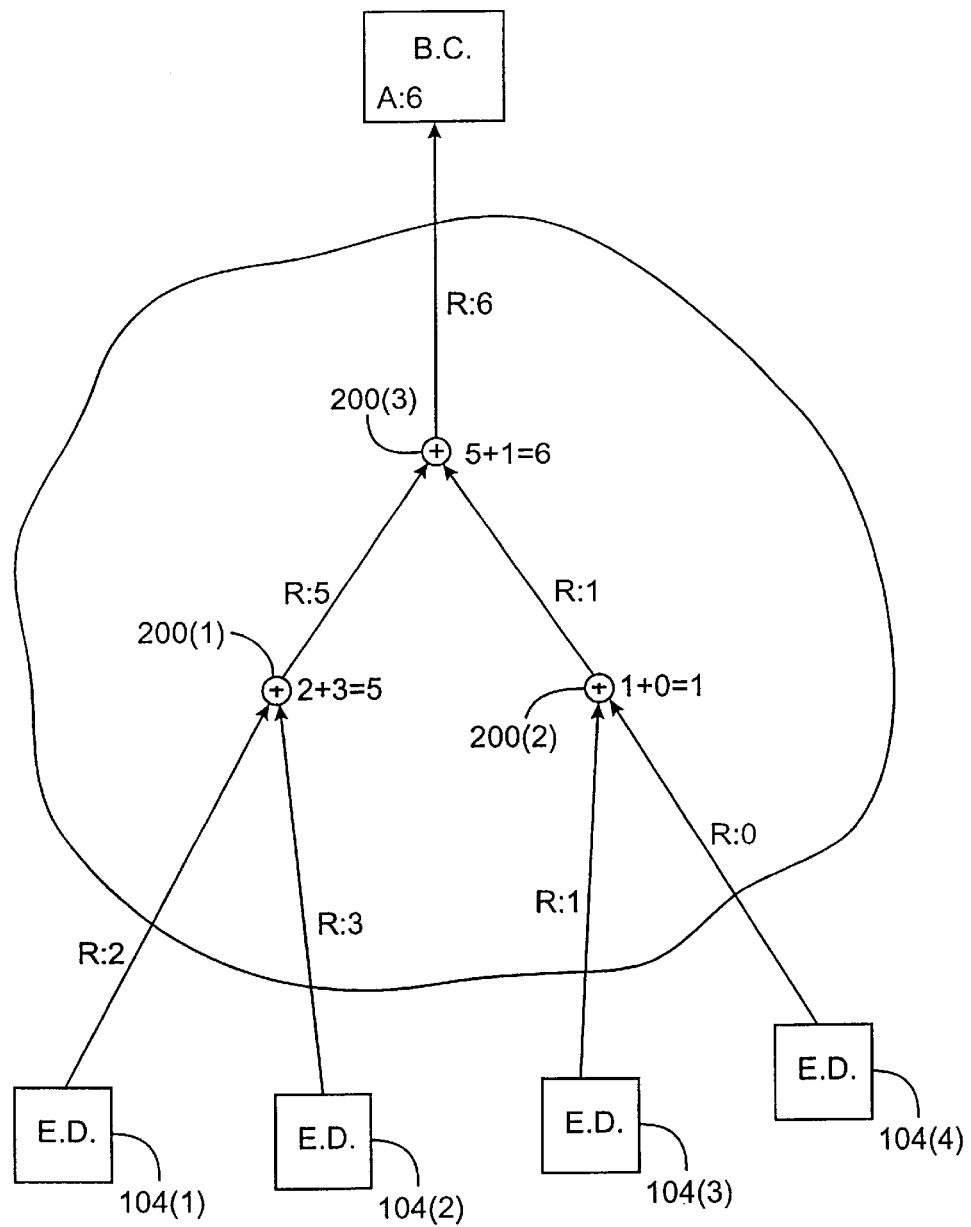
FIG. 7 is a diagram illustrating the flow of query responses to a collection node using aggregation at intermediate nodes with less increase in bandwidth use near a root collection point relative to the aggregation shown in FIG. 6.

FIG. 7 shows a more bandwidth and processing efficient approach to aggregation. It builds on the technique shown in FIG. 6, in which each AN in the tree combines the results from its children and sends a single response to its parent. However, unlike the arrangement in FIG. 6, in which ANs perform simple concatenation of their children's responses, the ANs in FIG. 7 apply an aggregation operator (other than simply concatenation) to the responses. In this case, the aggregation operator is simple addition: the responses of the children are added together and only their sum is propagated upward towards BC 110. Note that because of the aggregation, the arrows representing the responses in FIG. 7 do not get thicker.

The aggregation of FIG. 7 has several advantages. For one, it maintains a desirable property of the simple concatenation described in the previous section in that, because only one response packet flows along any link in the tree, the network processing performed at the routers and BC 110 can scale with large numbers of edge devices. Another advantage is that because each intermediate AN between the edge devices and BC 110 aggregates the responses that flow through it, the computational processing needed to analyze the queries is distributed throughout the CDN, instead of concentrated entirely at BC 110.

In this example, the aggregation operator is scalar addition. Rather than having BC 110 perform N–1 additions of the results from N edge devices, these N–1 additions are spread throughout the aggregating nodes 200 of the CDN. How effectively the data processing can be distributed depends on the specifics of the query and the aggregation function used, but in many cases (for example, addition) the maximum number of inputs any AN must analyze is upper bounded by the ANs' maximum fanout (i.e., the number of immediate children of a AN).

Yet another advantage is reduced bandwidth, since the bandwidth needed for sending response information to BC 110 is bounded and independent of the number of device nodes, resulting in scalability for large numbers of device nodes. In the addition example above, the size of the data flowing towards BC 110 stays constant, because the aggregation operator combines many scalar inputs into a single scalar output.

Note that although many examples given here include processing and aggregation at each AN, that need not be the case. For example, techniques described herein can easily be adapted so that only a subset of network nodes performs aggregation while others merely forward query responses they receive. Thus, a network could contain active AN's and passive AN's. Whether an AN is active or passive could be determined either statically during network configuration or with a dynamic protocol. In between aggregation nodes, the responses could flow as in FIG. 1 (separate flows), but overall scalability can still be ensured.

Figure 8A:
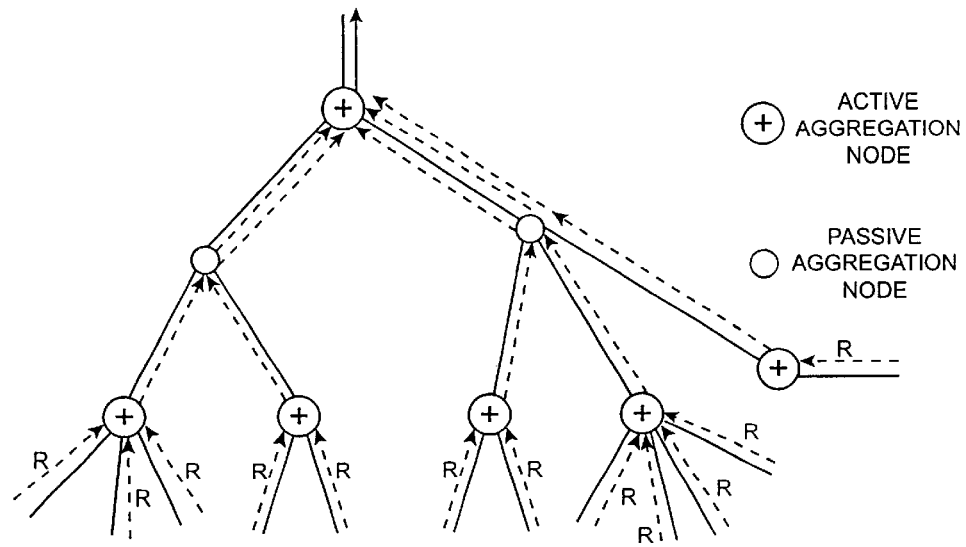
FIG. 8(a) is a diagram illustrating a query response network with active aggregation nodes and passive aggregation nodes.
Figure 8B:
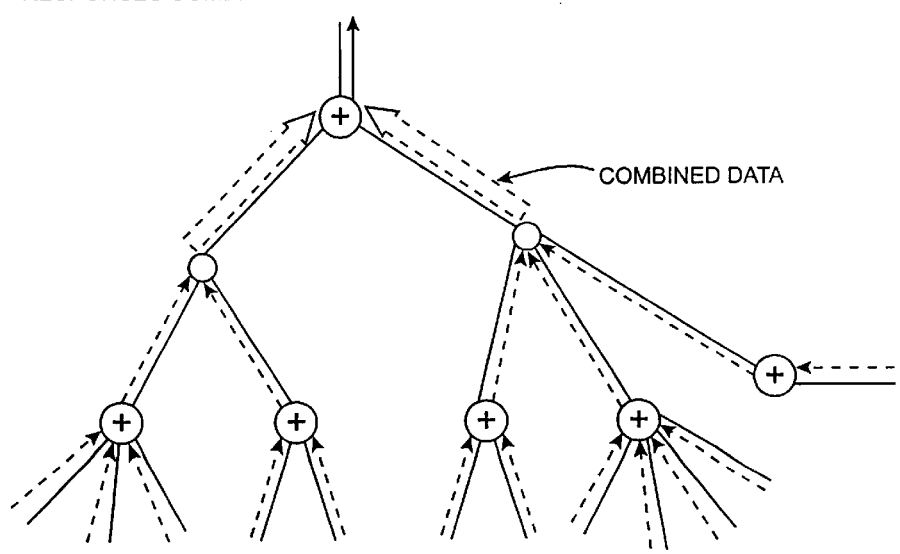
FIG. 8(b) is a diagram illustrating a similar arrangement, but with data combination at passive aggregation nodes.
Figure 10A:
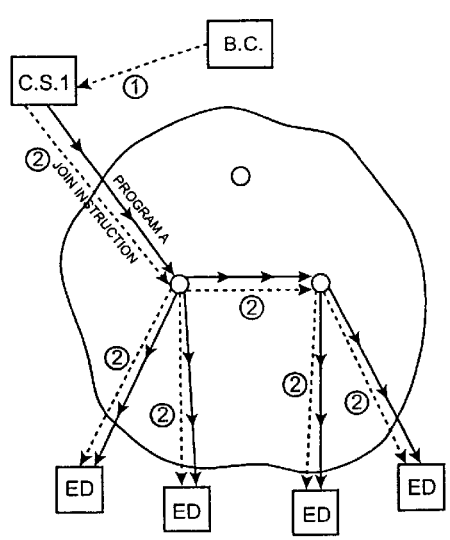
FIG. 10 illustrates using separate distribution trees for content and querying.
Figure 10B:
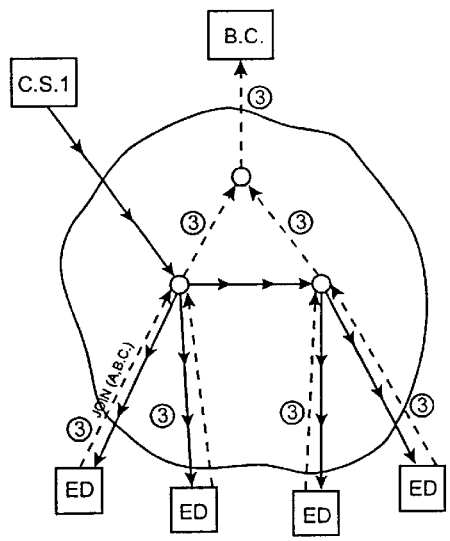
Figure 10C:
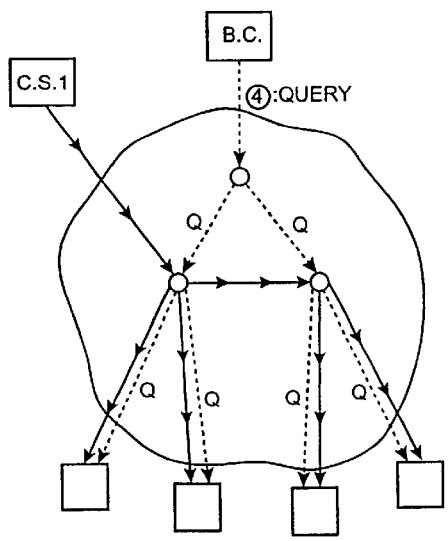
Figure 10D:
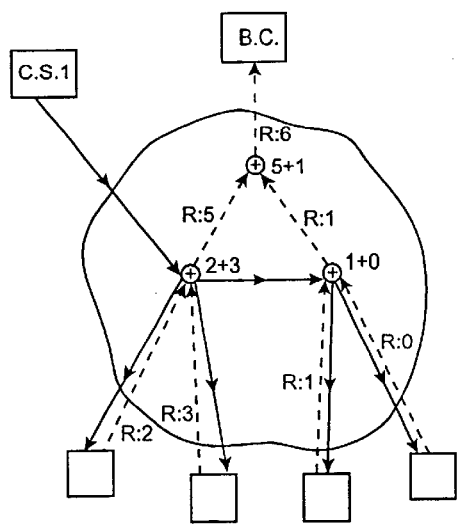

Two examples of this are shown in FIG. 8. FIG. 8(a) shows intermediate nodes that do not aggregate responses and just forward them on up the tree. Those are passive aggregation nodes. Note that although the response bandwidth and network overhead (i.e., the number of connections and packets used) can increase immediately up the tree from these nodes, as soon as an active aggregation node is reached, those factors scale back again. FIG. 8(b) shows a similar arrangement, except that the non-aggregating nodes (passive aggregation nodes) do concatenate responses before forwarding them up the tree. This reduces some of the network processing as described in the "Multicast Queries and Concatenated Responses" section above and illustrated in FIG. 7.

In the above examples, only one broadcast center that issues queries and receives responses is shown. However, in other embodiments, multiple broadcast centers can be used to issue different queries (or even identical queries, for robustness) to different subsets of the device nodes (or all of them).

Distributing Queries

This section details example embodiments of distribution mechanisms that can be applied to deliver queries from query nodes to device nodes. All of the examples in this section assume that the queries will be distributed using multicast for efficient delivery; but it should be apparent after review of this disclosure to apply these techniques if unicast is to be used for query distribution, as that case is much simpler.

Preferably, queries are uniquely identifiable where more than one query is flowing through the network (a likely occurrence), so that a device node can associate particular responses with particular queries and so that an aggregation node can distinguish among responses. In the following examples, a unique query identifier is assumed to be included with query messages sent from a query originator.

The identifier allows aggregation nodes to know which programmable aggregation operation(s) should be performed on the responses flowing into them and the identifier can be used for "controlling" the query. For example, the "query program" describing the information to be queried and how it should be combined need only be distributed to the device nodes once, even if it is to be executed multiple times.

Queries can be sent dynamically or they can be statically configured and stored in each device node. In either case, once a device node has seen a query, it only has to store it at the device node (in a table, for example) in such a manner that it may be referenced it by its identifier (for example, an N-bit number). One way to reliably propagate and "install" queries at the device nodes is to distribute the queries using the MINT protocol described in the MINT application (referenced above). The MINT protocol allows key-value pairs of information to be associated with or "published" to an Application-Level Multicast Group and reliably distributed to all members of that group. Queries (and query control messages) can be disseminated using the MINT protocol.

Once the queries are installed, instructions can then be distributed to device nodes telling them to start or stop running the query, to change the frequency of response, to modify parameters of the query itself, etc., simply by referring to the query identifier rather than by including the entire query structure (which might be a series of instructions, such as SQL instructions, or query instructions is a language specific to this application). In a particular implementation, the query structure or instructions are unique among queries so that query structure/instructions (or a hash thereof) can use used as the unique identifier. In that implementation, the responses would include the query structure, instructions or hash to identify the query to which the response is responsive.

Establishing/Configuring Query Distribution Trees

The section describes how query multicast distribution trees might be configured and established, the closely related issue of deciding what the delivery scope of the queries should be, and possible distribution mechanisms for delivering the queries to their destinations via their distribution trees.

Establishing a Distribution Tree

In setting up a distribution tree for queries and their responses, the destination of the queries is assumed to be known. In some cases, it is known exactly which edge devices and/or network nodes are to be queried. In other cases, explicit knowledge is not known, or strictly necessary, but instead just a class of device nodes is known (e.g., the class of all edge devices receiving program N from Content Source X). It is also assumed that there is some path for information flow from a source to the device nodes (which is not necessarily the same source as the query node). Returning again to the example application of a CDN, a broadcast center might be the at the query node and act as the query originator sending a query to all device nodes associated with edge devices pulling down a certain program stream. In this case, the edge devices are not explicitly known, but a mechanism exists for reaching the nodes: the multicast group rooted at the content source injecting the program into the CDN.

The process described below for establishing a query and response distribution tree is in two parts. The first part is to establish a multicast distribution tree for sending the queries. The queries flow from the root of this tree down towards its leaves (device nodes). Note that device nodes can be located in the interior of the tree as well as at the leaves. The second part is to establish a reverse-path collection tree upon which the responses will flow up from the device nodes towards a collection node. Aggregation nodes will be located at interior nodes in this tree (i.e., nonleaf nodes), so that responses flowing into an aggregation node from its child nodes (which could comprise one or more device nodes and/or other ANs) are aggregated into a response sent upwards to the parent of the AN (either another AN or the collection node at the root of this tree). Note that both the query distribution and the response aggregation trees can be the same, but they need not be. Also, it is possible to use still another tree to distribute the instructions necessary to construct the query distribution and/or collection trees.

A few example initialization steps that can be used for different network configurations are described below, once again using a CDN example wherein a broadcast center desires to send one or more queries to all edge devices receiving a program from a content source.

When the content source is located at the query node, the existing content distribution tree might be used for both the query distribution and response collection, as has already demonstrated by FIGS. 5 and 7. Alternatively, separate query distribution and response collection trees could be constructed, if desired, using techniques described below.

When the content source and the query node are in separate parts of the network, there are many possible techniques that can be used. The broadcast center and content source might use a point-to-point unicast connection to exchange query and response data. For example, FIG. 9(a) shows content distribution and FIG. 9(b) shows BC 110 unicasting a query to a content source 102, which then distributes the query to the edge devices. FIG. 9(c) shows collecting the responses at content source 102 and then delivering the final response back to the BC 110 via unicast. Thus, the existing content distribution tree is used for both the queries and responses. This technique allows the possibility of "piggybacking" queries onto program data that is already flowing to edge devices.

Another approach is to use separate distribution trees, as shown in FIG. 10. The tree used to distribute program data and queries (information which flows "down" towards the edge devices) can be different than the response collection tree used to collect and aggregate the query responses (which flow "up" from the edge devices towards the broadcast center). Additionally, the query distribution tree can also be different from the program data distribution tree, even though both trees may reach the same set of edge devices. Finally, the query distribution and response aggregation trees may be the same, but different from the program data distribution tree. FIG. 10 shows one framework that can allow for these different tree possibilities.

For example, consider a broadcast center that wants to send a query to the distribution tree of program A, rooted at content source CS 1. We refer to this tree as multicast group (A, CS 1). The broadcast center sends CS 1 a message to be distributed to program A's recipients instructing them to join a new query distribution group rooted at the broadcast center group, called group (A, broadcast center) (step 1, FIG. 10(a)). Content source CS 1 multicasts this join instruction to group (A, CS 1) (step 2, FIG. 10(a)). Upon receiving the instruction, group (A, CS 1)'s members send join messages up to the broadcast center, constructing the query distribution tree (step 3, FIG. 10(b)). Once the tree is established, the broadcast center multicasts queries on the new multicast group (step 4, FIG. 10(c)). Query responses flow up the reverse query distribution tree towards its root, the broadcast center (step 5, FIG. 10(d)). Aggregation nodes located along the tree can collect responses from below and generate aggregated responses sent up towards the broadcast center.

The framework illustrated in FIG. 10 can handle many different cases, such as:

1) Broadcasting all queries to all devices: If there is a single broadcast center, that broadcast center might simply broadcast any queries to all nodes and devices in the CDN, which would have joined a well-known "broadcast" distribution tree rooted at the broadcast center when they were initially configured. Queries could still contain information restricting what nodes or devices should respond to it. In this case, steps 1–3 of the above process are unnecessary.

2) Easily "derived" query multicast groups: If a query group corresponding to a program can be derived based on the program group and a well known formula (for example, group (X,CS N) would have a query group (N_X, broadcast center)), then all members could automatically join the query group after joining the program group. This eliminates steps 1 and 2 of the above process. Step 3 is performed whenever an edge device or node joins a program group.

3) Pre-configured query multicast groups: If every program group either has a statically configured query group that is told to all recipients when they first join the program group, step 1 is unnecessary. Steps 2–3 are performed whenever an edge device or node joins a program group.

4) Dynamic query group generation (use all of the steps to dynamically generate a query distribution tree): In this approach, if the CDN allows any member of a program tree to send to the tree, step 1 could be replaced by the broadcast center joining the program tree, and the join instruction of step 2 would then be sent directly by the broadcast center, rather than CS 1.

Delivery Scope

This section gives some examples of different delivery scopes that may be used with queries, using a CDN as the data network being queried. Where the delivery scope is all devices in the entire CDN, a query can be done using a well-known "broadcast" multicast channel that every device joins upon startup. Where the delivery scope is a dynamically configured subset of nodes of the CDN, such as the edge devices belonging to a specific content program distribution tree, another approach is needed. Because these devices may dynamically join and leave the program distribution group, the broadcast center does not know exactly, prior to sending the query, the query's intended recipients. However, the query can still reach all of the intended recipients if the query is broadcast on the program's distribution tree. This dynamic set of nodes could also include (or might consist solely of) the internal nodes belonging to a specific program tree (for example, the routing devices used to distribute the program). The programmable query could be sent along the program distribution tree and specify whether edge devices or internal nodes (or both) should act as device nodes.

Where the delivery scope is an arbitrary static subset of CDN nodes, the CDN might be configured with information about the domain (or domains) that each node belongs to. Domain-specific distribution trees can either be statically constructed during startup of the CDN (as each device in the CDN is initialized it joins a specified query distribution group(s) corresponding to its domain(s)), or they can be dynamically constructed at a later time, as necessary, by flooding a control information request (e.g., MINTs) to the entire CDN (using the well-known broadcast channel) instructing nodes matching a domain to join a domain information tree rooted at the broadcast center.

Depending on how the queries are delivered, queries may pass through some possible device nodes that are not supposed to respond to the query, but instead simply forward it on to other downstream device nodes. The programmable query may specify which devices are supposed to respond to it. At a high level, the query could simply specify that the query be executed on all network nodes that it passes through, or all edge devices that it reaches, or both. The query could also specify specific subsets of these.

Distribution Mechanisms

The queries and responses are delivered by the data network. There are many possible ways to do this. One would be to use a multicast distribution system for delivering the queries, and use a reverse-path multicast tree for delivering the responses. IP Multicast could be used if the routers are programmed with the ability to execute queries and run aggregation operations.

Application-Level Multicast (ALM) could also be used to perform the same functions, with the added advantage that more powerful and flexible query and aggregation operations can be implemented. For the reverse-path aggregation, the multicast routers need to know how to route "upwards" from the leaves of the tree towards the root. Alternatively, unicast could be used between devices in the query and/or response distribution trees if these device nodes and aggregation nodes are manually configured to route towards the next appropriate "hop" in the distribution tree.

Aggregation

Query responses and their aggregates can be categorized as either being single-dimensional (scalar) or multi-dimensional (vector). Scalar responses are those in which a device node returns a single value and which ANs can aggregate into another single value. For example, three different device nodes responding to the query "How many clients are watching program 101?" might produce scalar responses of 5, 3 and 0. An AN receiving these responses could then sum them together to form the scalar aggregate response of 8.

Figure 11:
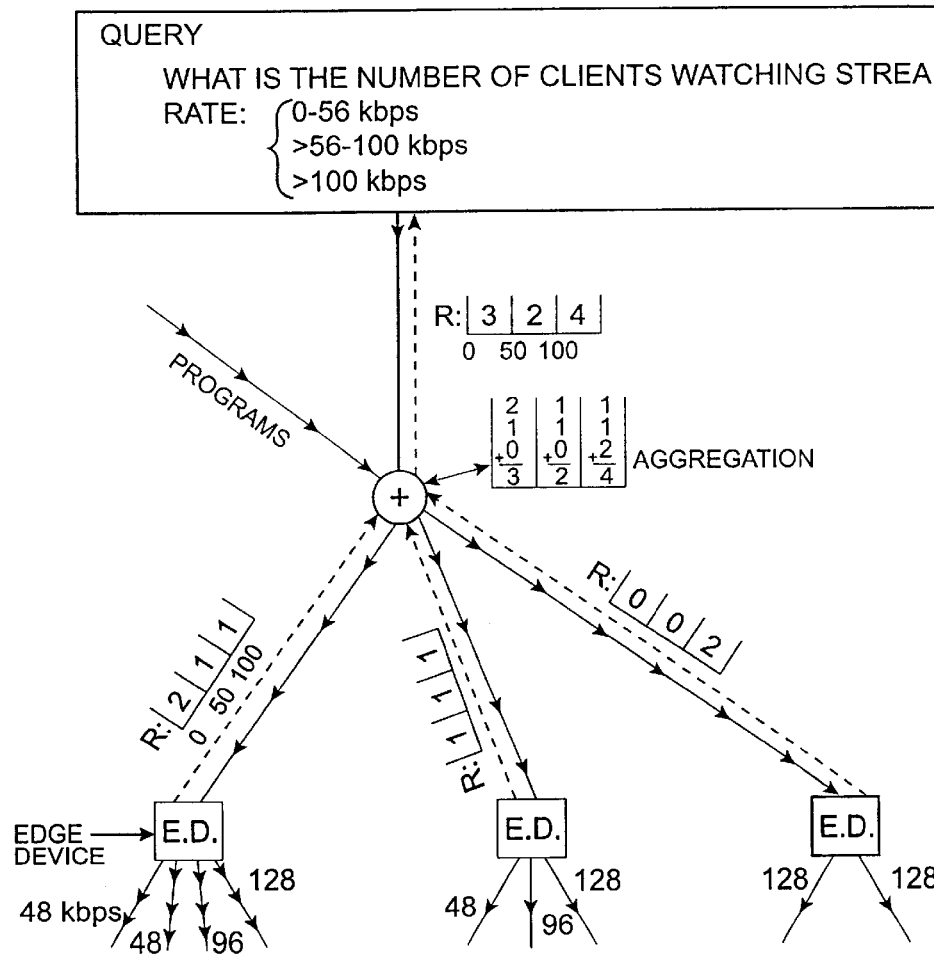
FIG. 11 illustrates aggregation of vector responses.

Vector responses can have more than one dimension. Vectors could be "distributions" in which the answers fall into a fixed and defined set of buckets or bins. For example, queries such as "How many servers have loads in the ranges [0–10%, 10–20%, ..., 90–100%]?" or "How many clients are viewing: [Program 1, Program 3, Program 7]?" would have a fixed set of bins. This is illustrated by FIG. 11 for a CDN example, which shows all responses (including the aggregate) having three dimensions (bins), even when the contents are zero. The responses are aggregated by summing the responses within each bin.

Figure 12:
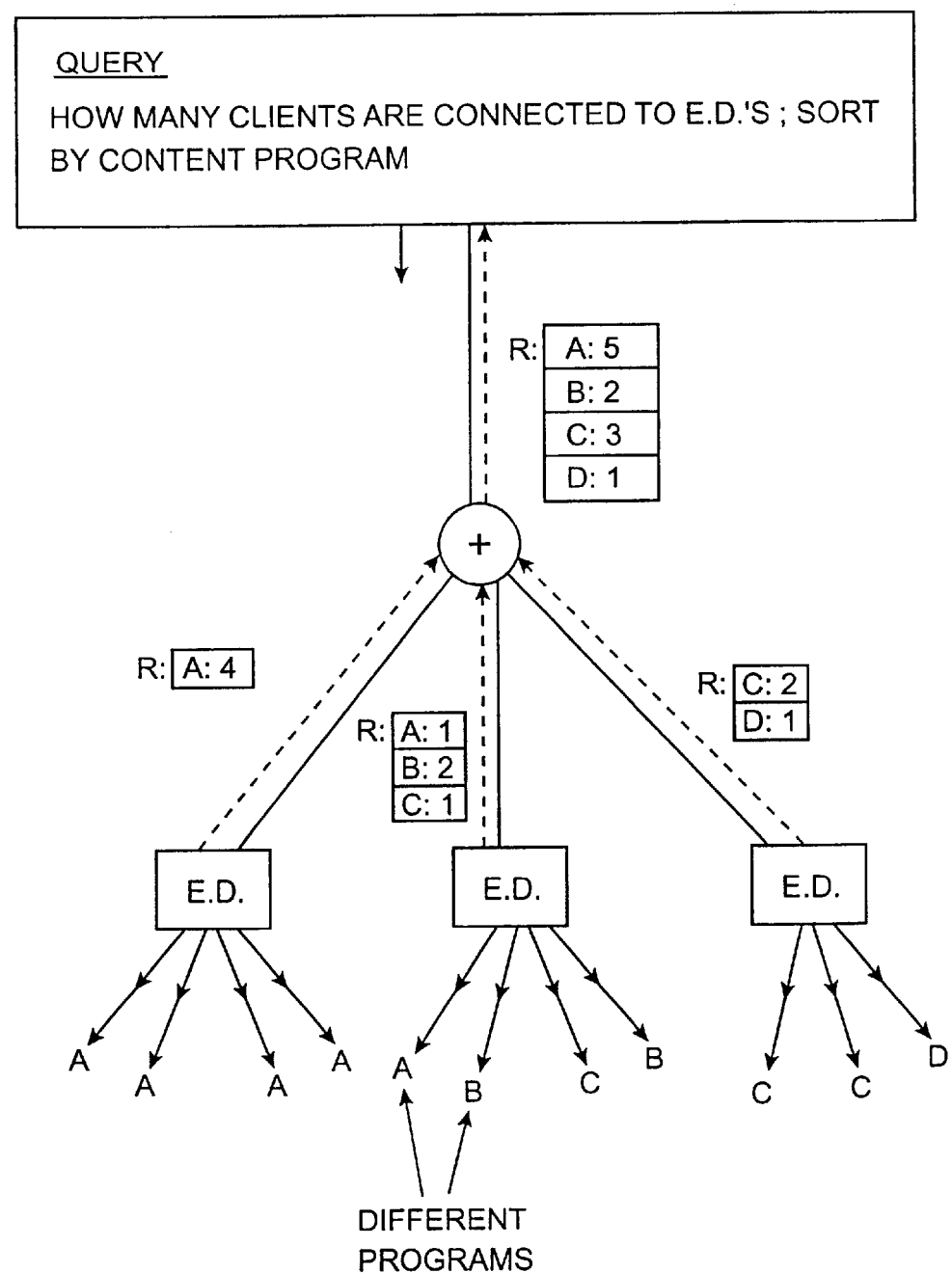
FIG. 12 illustrates aggregation of vector responses with variable length vector responses.

Vector responses can also be of variable length, such as the answers to the query "How many clients are watching all channels?" and an aggregation instruction "Return the results by channel" (the variable being the number of channels). This type of vector response is shown in FIG. 12 for a CDN. In the example, the responses comprise keys (the program channel, i.e. "A" or "C") and corresponding values. The size of the responses can increase as they flow up the aggregation response tree, as shown by FIG. 12. In this example, the query returns an amount of data upper bounded by the total number of channels being injected (which bounds are presumably known to the broadcast center).

Aggregation Operators

Because the aggregators are programmable, a myriad of possible aggregation techniques exists. Some of the possible aggregation operators include:

Addition: This operator sums the responses flowing into the AN to form the response that flows upward. This is straightforward for scalar responses. Addition may also be used to combine vector distributions (of fixed or variable length) together by performing scalar addition bin-by-bin. This is illustrated in FIGS. 11–12.

Concatenation: With concatenation, the results are simply combined or appended together. As such, the amount of data returned to the broadcast center increases linearly with the number of device nodes responding to the query. This may cause scaling issues, but a concatenation operation may still be acceptable to the data network provider, especially if the network has been appropriately provisioned with the bandwidth and processing power to handle the queries. An example use of concatenation would be to aggregate the responses to the query "What are the IP addressees of all clients watching Program 3?". Since the response collection system wishes to know all of the unique responses, all responses are simply combined together by the ANs and forwarded on.

Logical: An example is a query "are any servers experiencing greater than 90% load?"; the aggregation operator would logically OR the true/false responses.

Sort: This operator can be combined with concatenation to return a sorted list of results (using a programmable sort operator). The computational processing required to sort all of the responses is effectively distributed throughout the collection nodes and aggregation nodes by using a divide-and-conquer-style algorithm such as the "quicksort" algorithm.

Minimum: The aggregate response is the minimum value of all of the responses that flow into the aggregator.

Maximum: The aggregate response is the maximum value of all of the responses that flow into the aggregator.

Programmable filters could be used to exclude certain responses or aggregate them using AN-specific knowledge. For example, a query may ask "What is the distribution of computational load of the edge devices?" and specify that the results be aggregated by Internet Service Provider (ISP). The edge devices may not be explicitly programmed with knowledge of who their ISP is, and thus could leave the "backbone provider" field blank, or alternatively list their IP addresses instead. These responses would be concatenated together until they reach an AN at the edge of an ISP network. These edge ANs could be programmed with a full mapping of ISP to IP addresses (or simply know that any responses that flow into the edge must have originated from within the specific ISP), and hence they could aggregate the concatenated responses into groupings by ISP. As another example, the query might ask "What is the distribution of load of the edge devices belonging to ISP XYZ?", but the query may again be distributed to edge devices in other ISPs as well. Again assuming that these devices are ignorant of their ISP, they would all run the query and return a response as before. But this time the ISP-aware ANs would filter out or drop any responses originating from machines in ISPs other than XYZ.

Distributing the Aggregation Operators

Aggregation operators can be distributed using any of the techniques for distributing queries described above. For example, MINT could be used to distribute and install operators and ANs in an ALM network. And just like queries, each aggregation operation should have some kind of unique identifier. The primary purpose of this identifier is to allow the aggregation operation to be associated with a query and its responses, but it can also be used for other purposes such as referencing installed aggregation operators in control information. One identifier that can be used is simply the identifier of the query to be aggregated (which could be the query itself). Another identifier is the aggregation operator itself, which could be distributed by the query originator to each device node and then included in all responses flowing from the device nodes to the ANs. In general, the aggregation operator identifier need not be the same, because a query may have multiple different aggregation operators performed on its responses, or vice versa, where the same aggregation operator is used on the responses of multiple different programmable queries.

Query and Response Frequency

One feature of the programmable nature of the queries and aggregators (where programmable queries and aggregators are used) is that the frequency of response can be specified as well. There are many examples of situations where a query should be performed multiple times. For example, a query delivered to a CDN asking, "How many viewers are watching program 101?" would result in a viewer count or "ratings snapshot" at the particular time the query was issued, if the device nodes only responded to it once. However, if the query specified that the device nodes respond every 5 seconds, the queryor then can not only get a near-real-time viewership ratings snapshot, but can also see how the ratings evolve over the life of the program. The ratings are "near-real-time" not only because there may be some network and processing delay to transmit responses from device nodes through ANs and to the collection node, but also because the programmable aggregation operator may introduce some delay in order to save bandwidth.

Because the query frequency is a fully programmable aspect of the query, many possible choices of response frequency exist, such as single response (the device nodes respond only once to the query), finite persistence, indefinite persistence and threshold responses.

Finite persistence is a generalization of the single response, wherein the query may instruct device nodes to execute the query multiple times. The query might define the period between responses and persist until a fixed number of responses have been generated or a certain time has been reached. This could be used to view a "window" of data at a particular point in time.

An indefinite persistence query specifies that the device nodes should execute the query periodically, with no end time or maximum number of responses specified. The period T of the query is programmable. Additionally, the device nodes might execute the query every T plus or minus X time units (where X is random or pseudorandom), such that the inter-response interval is not always exactly T, but averages out to T over time. This randomization can be used to avoid synchronization of all responses (i.e., avoid having all responses from flowing to an AN or a collection node at exactly the same time). Similar phenomena observed in the periodic exchange of routing messages in the Internet are described in Floyd, S. and Jacobson, V., "The Synchronization of Periodic Routing Messages", IEEE/ACM Transactions on Networking, V.2 N.2, p. 122–36 (April 1994).

Threshold responses are persistent queries (either finite or indefinite) that get run at the device nodes and, instead of being run at a fixed period, are only run when the response changes by more than a programmable threshold amount. Additionally, the query may specify that device nodes should also respond at a low frequency even if their response has not exceeded the threshold, to provide robustness against packet loss and ensure that the aggregated response reflects the state of the devices within a recent time interval.

Just as a query's response generation at the device nodes may be specified, the frequency at which an aggregated response is generated and propagated up towards the collection node may also be specified. Some possible frequencies include unlimited, frequency-limited, rate-limited, programmable rate and policy-based.

With no limit frequency, an aggregator generates a new aggregated response whenever it receives a new response from any of its children. This method does not scale well, as each response generated by a device node results in a response being propagated all the way up the aggregation distribution tree to the collection node root. However, this may be more scalable if used with thresholded queries.

With frequency-limited responses, an aggregator may be programmed to generate an aggregate response every T time units. Randomization and/or threshold techniques (as described above) can also be applied. If the aggregation period is the same as a periodic query, the result is that, on average, an AN should receive a new query update (or aggregated response from another AN) from each of its children between each aggregate response generated by the AN.

With rate-limited responses, a token-bucket or other rate-controlling mechanism might be used to ensure that the bandwidth of the aggregated responses does not exceed a defined limit. This may be useful with the concatenation aggregation operator or other aggregation operators that may result in the size of the aggregate response being larger than the size of any response flowing into the AN.

With programmable rate responses, if the query and response aggregation trees are identical, an AN may have the ability to specify the rate at which it wishes to receive responses from its children by modifying the programmable query/aggregator as it flows down the tree through the node the AN is attached to. An AN can control the total rate of responses flowing into it using such a method. For example, an AN may have 5 children, be running 3 queries, and wish to receive no more than 30 responses/second. Before forwarding each query and aggregation information to its children, it may modify them to specify that each child should send a response every 0.5 seconds.

With policy-based response frequencies, the query/response frequency can also be determined by customer-specific bandwidth policies. These can be influenced by attributes in the query itself, as well as bandwidth-sharing policies defined by the CDN (for example, as taught by Welch. For example, a CDN may specify that a customer be allowed to run queries at a "typical rate" comprising a maximum bandwidth and/or update frequency that may be used. However, the actual rate allocated to that customer's queries might be limited by available network bandwidth, in which case a bandwidth-sharing policy is used to determine what actual rate to give to the queries.

Figure 13:
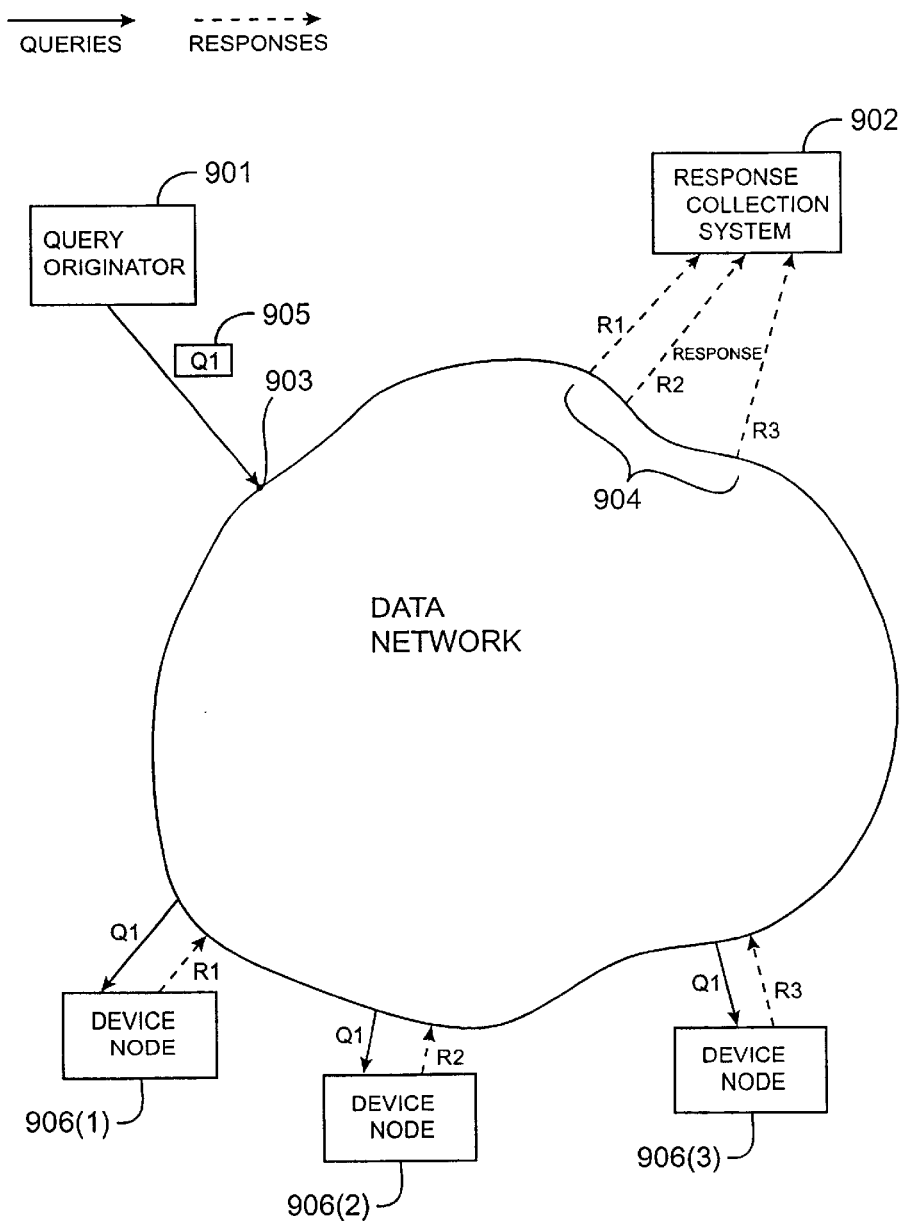
FIG. 13 is a diagram illustrating the issuance of queries and collection of responses at different nodes.
Figure 14:
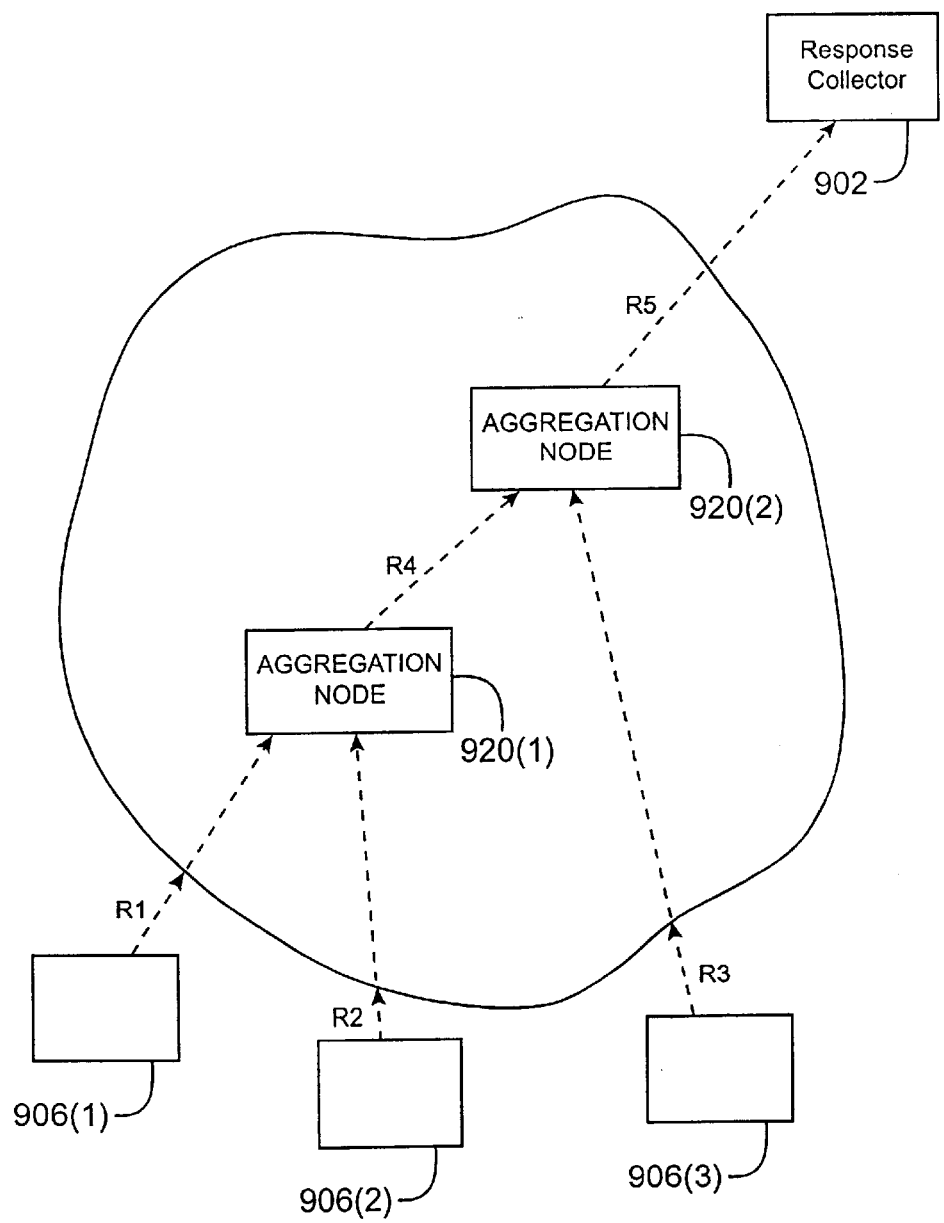
FIG. 14 illustrates multiple levels of aggregation nodes.

FIGS. 13–14 illustrate a basic query network handling system used with a generic data network. In FIG. 13, a cloud represents the equipment that makes up the network. A query originator 901 and a response collection system 902 are shown in FIG. 13, coupled to query node 903 and collection node 904, respectively. Query originator 901 distributes a query 905 and response collection system 902 receives the query response data. Examples of query originators and response collection systems include a broadcast center running in a CDN and a "Network Operation Center" (NOC) in a general data network. Query originator 901 delivers query 905 via the data network to device nodes 906(1)–(3). The programmable queries are received at each of these device nodes and the responses are returned back through the data network to response collection system 902. The device nodes might also provide a naming system to map well known virtual names (that may be used in programmable queries) onto corresponding physical, equipment-specific names. This allows different, heterogeneous equipment to respond to the same query. The device nodes 906 might be included as part of the devices being queried, or could be a separate components that are able to obtain responses to the query about the devices.

FIG. 14 shows the query responses first shown in FIG. 13 flowing through two aggregation nodes 920. Responses R1 and R2 flow through aggregation node (AN) 920(1), where they are aggregated into response R4. This response, along with response R3, flows through AN 920(2), and finally the resulting aggregated response R5 is the only one delivered to collection node 904. Depending on the aggregation operation, this can result in network bandwidth savings. For example, the programmable aggregation operation for a query in a CDN asking "How many viewers are watching program 700?" could sum the responses together to form the aggregate response, and so N responses each of data size X flowing into an AN result in a single aggregate response of size X. The maximum amount of response data flowing towards any aggregation node or collection node in the network is hence bounded not by the number of device nodes, but instead by the maximum fanout.

A novel query handling system and several novel components have now been described. Alternatives and substitutions will now be apparent to persons of skill in the art. Accordingly, it is not intended to limit the invention except as provided by the appended claims.

What is claimed is:

1. In a data network wherein a plurality of queryable network devices respond to queries from a query originator, an aggregator at an aggregation node of the data network, the aggregator comprising:

a query response collector coupled to receive a plurality of query responses;

a query identifier for identifying an aggregation function for the plurality of query responses, wherein the query identifier includes a query function lookup table and the query identifier includes logic to read a query reference from the plurality of query responses and to use the query reference as an index into the lookup table to identify the aggregation function for the plurality of query responses;

a processor, coupled to the query identifier and the query response collector, for applying the aggregation function to response data in the plurality of query responses to form an aggregated query response representing the plurality of query responses; and an aggregated query response generator that generates a query response in a form expected by another recipient of query responses.

2. The aggregator of claim 1, wherein the data network is a content distribution network and to queries are queries about content distribution in the data network.

3. The aggregator of claim 1, wherein the aggregation function is one or more of concatenation, addition and a binary logical operation.

4. The aggregator of claim 1, further comprising query pathways over which queries are transmitted from the query originator to the plurality of queryable network devices.

5. The aggregator of claim 4, wherein the query pathways are unicast packet paths.

6. The aggregator of claim 4, wherein the query pathways are multicast packet paths.

7. A query management system, wherein a query originator coupled to a network at a query node generates a query and a plurality of respondents, coupled to the network at device nodes, receives queries directed at their associated device nodes and include logic to generate responses to the query from the query originator, the responses being directed at a response collector coupled to the network at a collection node that collects responses to the query, the query management system comprising:

a plurality of aggregators, each at an aggregation node of the network, each aggregator comprising:

a) a query response collector coupled to receive query responses from device nodes and/or other aggregator nodes;

b) a query identifier for identifying an aggregation function for the plurality of query responses, wherein the query identifier includes a query function lookup table and the query identifier includes logic to read a query reference from the plurality of query responses and to use the query reference as an index into the lookup table to identify the aggregation function for the plurality of query responses;

c) a processor, coupled to the query identifier and the query response collector, for applying the aggregation function to response data in the plurality of query responses to form an aggregated query response representing the plurality of query responses; and d) an aggregated query response generator that generates a query response in a form expected by another recipient of query responses; and logic coupling each of the plurality of respondents to at least one associated device to which the query relates.

8. The query management system of claim 7, wherein the query node and the collection node are the same node.

9. The query management system of claim 8, wherein the query originator is the response collector for queries originated at that query originator.

10. The query management system of claim 7, wherein the network is a content distribution network and the queries are queries about content distribution in the network.

11. The query management system of claim 7, wherein the aggregation function is one or more of concatenation, addition and a binary logical operation.

12. The query management system of claim 7, wherein the respondents include reference translators to translate elements of a query or of a response such that the elements are made uniform over the devices being queried.

13. The query management system of claim 7, wherein at least one of the plurality of aggregators is an aggregator that can be an active aggregator or a passive aggregator.

14. A query management system, wherein a query originator coupled to a network at a query node generates a query and a plurality of respondents, coupled to the network at device nodes, receives queries directed at their associated device nodes and include logic to generate responses to the query from the query originator, the responses being directed at a response collector coupled to the network at a collection node that collects responses to the query, to query management system comprising:

a plurality of aggregators, each at an aggregation node of the network, wherein the plurality of aggregators are active aggregators and each aggregator comprising:

a) a query response collector coupled to receive query responses from device nodes and/or other aggregator nodes;

b) a query identifier for identifying an aggregation function for the plurality of query responses;

c) a processor, coupled to the query identifier and the query response collector, for applying the aggregation function to response data in the plurality of query responses to form an aggregated query response representing the plurality of query responses; and d) an aggregated query response generator that generates a query response in a form expected by another recipient of query responses;

logic coupling each of the plurality of respondents to at least one associated device to which the query relates; and at least one passive aggregator that includes a query response collector coupled to receive query responses from device nodes and/or other passive or active aggregator nodes and includes an aggregated query response generator that generates a passive query response in a form expected by another recipient of query responses.

* * * * *